United States Patent
Esbensen et al.

(10) Patent No.: US 12,018,652 B2
(45) Date of Patent: Jun. 25, 2024

(54) METHOD AND CONTROLLER FOR FULL-POWER CONTROL OF A WIND TURBINE

(71) Applicant: Siemens Gamesa Renewable Energy A/S, Brande (DK)

(72) Inventors: Thomas Esbensen, Herning (DK); Gustav Hoegh, Vejle (DK)

(73) Assignee: Siemens Gamesa Renewable Energy A/S, Brande (DK)

(*) Notice: Subject to any disclaimer, the term of this patent is extended or adjusted under 35 U.S.C. 154(b) by 421 days.

(21) Appl. No.: 17/299,421

(22) PCT Filed: Oct. 31, 2019

(86) PCT No.: PCT/EP2019/079800
§ 371 (c)(1),
(2) Date: Jun. 3, 2021

(87) PCT Pub. No.: WO2020/120008
PCT Pub. Date: Jun. 18, 2020

(65) Prior Publication Data
US 2022/0082082 A1    Mar. 17, 2022

(30) Foreign Application Priority Data
Dec. 13, 2018 (EP) .................................. 18212376

(51) Int. Cl.
*F03D 7/02* (2006.01)

(52) U.S. Cl.
CPC ......... *F03D 7/0224* (2013.01); *F03D 7/0232* (2013.01); *F03D 7/0236* (2013.01); *F03D 7/0276* (2013.01); *F05B 2270/1033* (2013.01)

(58) Field of Classification Search
CPC .... F03D 7/0224; F03D 7/0232; F03D 7/0236; F03D 7/0276; F05B 2270/1033; Y02E 10/72
See application file for complete search history.

(56) References Cited

U.S. PATENT DOCUMENTS

| H002057 H | 1/2003 | Veers et al. |
| 10,557,456 B2 * | 2/2020 | Kjær .................. F03D 7/028 |

(Continued)

FOREIGN PATENT DOCUMENTS

| CN | 1426510 A | 6/2003 |
| CN | 1900513 A | 1/2007 |

(Continued)

OTHER PUBLICATIONS

Ullah, N.R., Thiringer, T. and Karlsson, D., 2008. Temporary primary frequency control support by variable speed wind turbines—Potential and applications. IEEE Transactions on Power Systems, 23(2), pp. 601-612. (Year: 2008).*

(Continued)

*Primary Examiner* — Alicia M. Choi
(74) *Attorney, Agent, or Firm* — Schmeiser, Olsen & Watts LLP

(57) ABSTRACT

Provided is a method of setting and clearing a full-power flag in a control process running on a wind turbine controller, the method including (a) acquiring a set of measured values and/or reference values for: rotor speed, output power, blade pitch angle, and activation level of an adaptive flow regulating system, (b) determining that a first condition is fulfilled when the value of the rotor speed equals a speed limit value and the output power reference value equals a power limit value, (c) determining when the blade pitch angle reference value fulfills a pitch condition and the activation level of the adaptive flow regulating system fulfills an adaptive flow regulating condition, or when the (Continued)

measured value of the rotor speed is below the speed limit value, (d) setting the full-power flag, and (e) clearing the full-power flag. Furthermore, a wind turbine controller and a wind turbine including such a controller.

8 Claims, 1 Drawing Sheet

(56) References Cited

U.S. PATENT DOCUMENTS

| | | |
|---|---|---|
| 2003/0185665 A1 | 10/2003 | Hansen |
| 2006/0273595 A1 | 12/2006 | Avagliano et al. |
| 2007/0018457 A1 | 1/2007 | Llorente Gonzalez |
| 2007/0243060 A1 | 10/2007 | Talavera Martin |
| 2012/0161444 A1* | 6/2012 | Tarnowski .............. H02P 9/107 290/44 |
| 2013/0154263 A1* | 6/2013 | Attia .................... F03D 7/0272 290/44 |
| 2013/0181450 A1 | 7/2013 | Narayana et al. |
| 2015/0176568 A1* | 6/2015 | Laborda Rubio ..... F03D 7/0224 416/1 |
| 2015/0176570 A1* | 6/2015 | Egedal ................. F03D 7/0224 73/112.01 |
| 2015/0211484 A1* | 7/2015 | Couchman ............. F03D 13/20 416/1 |
| 2015/0226183 A1* | 8/2015 | Esbensen ............. F03D 7/0276 290/44 |
| 2016/0069323 A1* | 3/2016 | Arlaban Gabeiras ....................... F03D 7/0276 416/37 |
| 2016/0177924 A1 | 6/2016 | Xue et al. |
| 2017/0057650 A1* | 3/2017 | Walter-Robinson ....................... H02J 7/0068 |
| 2018/0058424 A1 | 3/2018 | Egedal et al. |
| 2018/0187652 A1 | 7/2018 | Wagoner et al. |
| 2018/0331643 A1 | 11/2018 | Ganireddy et al. |
| 2019/0055924 A1* | 2/2019 | Kjær ...................... F03D 7/048 |

FOREIGN PATENT DOCUMENTS

| | | |
|---|---|---|
| CN | 101002018 A | 7/2007 |
| CN | 101865081 A | 10/2010 |
| CN | 103206344 A | 7/2013 |
| DE | 102007035724 A1 | 2/2009 |
| DE | 202010001773 U1 | 1/2011 |
| EP | 2767709 A1 | 8/2014 |
| EP | 3290688 A1 | 3/2018 |
| EP | 3402065 A1 | 11/2018 |
| GB | 1448346 A | 9/1976 |

OTHER PUBLICATIONS

International Search Report and Written Opinion of the International Searching Authority dated Jan. 15, 2020 for Application No. PCT/EP2019/079800.

European Search Report and Written Opinion of the European Searching Authority dated Jun. 25, 2019 for Application No. 18212376.0.

* cited by examiner

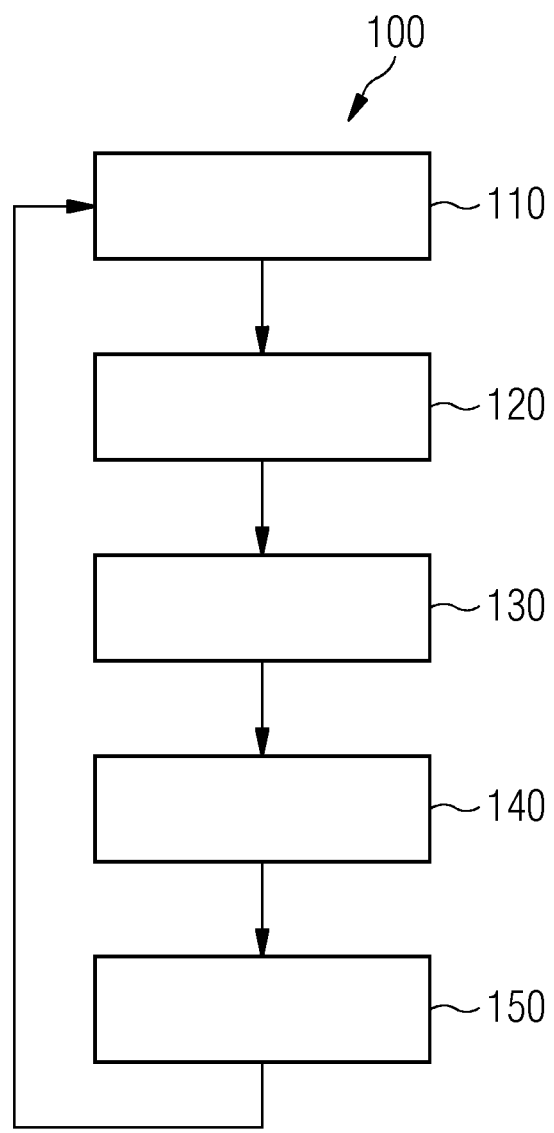

METHOD AND CONTROLLER FOR FULL-POWER CONTROL OF A WIND TURBINE

CROSS-REFERENCE TO RELATED APPLICATIONS

This application claims priority to PCT Application No. PCT/EP2019/079800, having a filing date of Oct. 31, 2019, which is based off of EP Application No. 18212376.0, having a filing date of Dec. 13, 2018, the entire contents both of which are hereby incorporated by reference.

FIELD OF TECHNOLOGY

The following relates to the field of wind turbines, in particular to a method and controller for full-power control of a wind turbine.

BACKGROUND

Wind turbines may have a lower power production than expected in the full-load region, especially in high turbulence, if special care is not taken in designing the wind turbine speed controllers.

One approach is to use a state machine to determine whether the turbine is operating above or below the rated wind speed. When operating above rated wind speed, the output of the Speed-Power controller is forced to the maximum power (or maximum torque, dependent on the power capabilities). This ensures that power production is kept high at high wind speed even during periods with high turbulence, where the rotor speed may vary significantly around the speed reference. The function will furthermore ensure that the maximum power is not maintained for too long when the wind speed is decreasing, as this will eventually cause significant speed and power drops which are more difficult to recover from and will cause a significant load cycle.

However, with increasing complexity and flexibility of modern wind turbine control systems, an aspect relates to further optimization, in particular in terms of maximizing power production.

SUMMARY

According to a first aspect of embodiments of the invention, there is provided a method of setting and clearing a full-power flag in a control process running on a wind turbine controller. The method comprises (a) acquiring a set of measured values and/or reference values for the following parameters: rotor speed, output power, blade pitch angle, and activation level of an adaptive flow regulating system, (b) determining that a first condition is fulfilled when the measured value of the rotor speed equals a speed limit value and the output power reference value equals a power limit value, (c) determining that a second condition is fulfilled when the blade pitch angle reference value fulfills a pitch condition and the activation level of the adaptive flow regulating system fulfills an adaptive flow regulating condition, or when the measured value of the rotor speed is below the speed limit value, (d) setting the full-power flag if the first condition is fulfilled and the second condition has not been fulfilled for a first predetermined period of time, and (e) clearing the full-power flag if the second condition is fulfilled.

This aspect of embodiments of the invention is based on the idea that the full-power flag is set when a first condition is fulfilled, i.e., when both rotor speed and output power equal respective limit (i.e. maximum) values, while the full-power flag is cleared when a second condition is fulfilled, i.e. when both a pitch condition and an adaptive flow regulating condition are fulfilled or when the rotor speed is below the speed limit value. Furthermore, in order to increase stability, the full-power flag is only set when the second condition (i.e., the condition for clearing the full-power flag) has not been fulfilled for a first predetermined period of time. In other words, the full-power flag cannot be set until the first period of time has elapsed since the full-power flag was cleared.

In the present context, the term "measured values" may in particular denote actual or current values, while the term "reference values" in particular may denote control values or set point values.

In the present context, the term "adaptive flow regulating system" may in particular denote a system comprising a plurality of devices arranged on the rotor blades of the wind turbine, each device being capable of influencing the flow characteristics at a given section of the rotor blade surface. In some embodiments, the adaptive flow regulating devices may be implemented as adjustable spoilers or flaps, which may e.g., be selectively and adjustably raised (e.g. by pneumatic actuation) above the surface of the rotor blade.

It is explicitly noted that the generator speed may be used instead of the rotor speed.

By requiring that both a pitch condition and an adaptive flow regulating condition are fulfilled in order to clear the full-power flag, overall power capture at high wind speeds and/or high turbulence levels is significantly improved.

According to an embodiment of the invention, the pitch condition is fulfilled when a difference between the reference value for the blade pitch angle and a predetermined minimum pitch angle value is below a first pitch threshold value.

In other words, the pitch condition is fulfilled when the pitch reference value is close to the predetermined minimum pitch angle. When this is the case, a relatively small amount of pitching is applied, indicating that wind speed is not particularly high.

According to a further embodiment of the invention, the pitch condition is fulfilled when an estimate for the time it will take before the reference value for the blade pitch angle reaches the predetermined minimum pitch angle is below a second pitch threshold value.

The estimate may be obtained based on a gradient, calculated e.g. from a series of blade pitch reference values. When the estimated time is below the second pitch threshold value, this indicates that the minimum pitch angle will be reached soon and thus that the wind speed is not particularly high and decreasing.

According to a further embodiment of the invention, the adaptive flow regulating condition is fulfilled when the reference value for the activation level of the adaptive flow regulating system is below a first flow regulating threshold value.

In other words, a relatively small activation level is required, indicating that the current wind speed is not particularly high.

According to a further embodiment of the invention, the adaptive flow regulating condition is fulfilled when an estimate for the time it will take before the reference value for the activation level of the adaptive flow regulating system reaches a value corresponding to an inactive adaptive flow regulating system is below a second flow regulating threshold value.

The estimate may be obtained based on a gradient, calculated e.g., from a series of reference values for the activation level of the adaptive flow regulating system. When the estimated time is below the second flow regulating threshold value, this indicates that the adaptive flow regulating system will soon be inactive and thus that the wind speed is not particularly high and decreasing.

According to a further embodiment of the invention, the first condition is fulfilled when the measured value of the rotor speed has reached the speed limit value within a second predetermined period of time and the output power reference value has reached the power limit value within a third predetermined period of time.

Thereby, it can be assured that recent changes in set points have been adopted by the controller.

According to a second aspect of embodiments of the invention, there is provided a wind turbine controller comprising a processing unit adapted to perform the method according to the first aspect or any of the embodiments discussed above.

This aspect is based on essentially the same idea as the first aspect described above.

According to a third aspect of embodiments of the invention, there is provided a wind turbine comprising a wind turbine controller according to the second aspect.

The wind turbine according to this aspect will be capable of achieving an excellent overall power capture at high wind speeds and/or high turbulence levels.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention are not limited to the described exemplary embodiments.

BRIEF DESCRIPTION

Some of the embodiments will be described in detail, with reference to the following FIGURE, wherein like designations denote like members, wherein:

FIG. 1 shows a flow chart of a method according to an embodiment of the present invention.

DETAILED DESCRIPTION

The illustration in the drawing is schematic. It is noted that in different figures, similar or identical elements are provided with the same reference numerals or with reference numerals which differ only within the first digit.

When a wind turbine comprises an adaptive flow regulating system, the controller may advantageously take the activation level of the adaptive flow regulating system into consideration for correctly judging if the power can be kept high. This is e.g. possible if blade pitch angle is close to optimal and the adaptive flow regulating system is fully activated, but not if the adaptive flow regulating system is only slightly activated.

By taking the activation level of the adaptive flow regulating system into account, loss of power production and increase in rotor speed variations can be prevented.

FIG. 1 shows a flow chart of a method 100 according to an embodiment of the present invention. More specifically, at 110 a set of measured values and/or reference values for the parameters rotor speed, output power, blade pitch angle, and activation level of the adaptive flow regulating system is acquired.

Then, at 120, it is determined whether a first condition is fulfilled. This is the case when the measured value of the rotor speed equals a speed limit value, and the output power reference value equals a power limit value. In some embodiments, the first condition is fulfilled when the measured value of the rotor speed and the output power reference value have respectively reached the speed limit value and power limit value within certain predetermined periods of time, i.e. recently.

At 130, it is determined whether a second condition is fulfilled. This is the case when the blade pitch angle reference value fulfills a pitch condition and the activation level of the adaptive flow regulating system fulfills an adaptive flow regulating condition, or when the measured value of the rotor speed is below the speed limit value.

More specifically, the pitch condition may be fulfilled when a difference between the reference value for the blade pitch angle and a predetermined minimum pitch angle value is below a first pitch threshold value, or an estimate for the time it will take before the reference value for the blade pitch angle reaches the predetermined minimum pitch angle is below a second pitch threshold value.

In other words, the pitch condition is fulfilled when the reference value for the blade pitch angle is close to the predetermined minimum pitch angle or soon will be.

The adaptive flow regulating condition may be fulfilled when the reference value for the activation level of the adaptive flow regulating system is below a first flow regulating threshold value, or an estimate for the time it will take before the reference value for the activation level of the adaptive flow regulating system reaches a value corresponding to an inactive adaptive flow regulating system is below a second flow regulating threshold value.

In other words, adaptive flow regulating condition is fulfilled when the adaptive flow regulating system is close to being inactive or soon will be.

Then, at 140, the full-power flag is set if the first condition is fulfilled and the second condition has not been fulfilled for a certain (first) period of time.

Furthermore, at 150, the full power flag is cleared if the second condition is fulfilled.

Thereafter, the method 100 returns to 110 and repeats the steps and actions described above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of setting and clearing a full-power flag in a control process running on a wind turbine controller, the method comprising:

acquiring a set of measured values and/or reference values for the following parameters:

rotor speed, output power, blade pitch angle, and activation level of an adaptive flow regulating system;

determining that a first condition is fulfilled when the measured value of the rotor speed equals a speed limit value and the output power reference value equals a power limit value;

determining that a second condition is fulfilled when the reference value for the blade pitch angle fulfills a pitch condition and the activation level of the adaptive flow regulating system fulfills an adaptive flow regulating condition, or when the measured value of the rotor speed is below the speed limit value;

setting the full-power flag of the running control of the wind turbine controller in response to the first condition being fulfilled and the second condition not being fulfilled for a first predetermined period of time; and clearing the full-power flag of the running control of the wind turbine controller in response to the second condition being fulfilled, wherein after said clearing the full-power flag, the full-power flag cannot be set until the first predetermined period of time has elapsed since said clearing the full-power flag was performed.

2. The method according to claim 1, wherein the reference value for the blade pitch angle fulfills the pitch condition and the activation level of the adaptive flow regulating system fulfills the adaptive flow regulating condition, and wherein the pitch condition is fulfilled when a difference between the reference value for the blade pitch angle and a predetermined minimum pitch angle value is below a first pitch threshold value.

3. The method according to claim 2, wherein the pitch condition is fulfilled when an estimate for the time it will take before the reference value for the blade pitch angle reaches the predetermined minimum pitch angle is below a second pitch threshold value.

4. The method according to claim 1, wherein the adaptive flow regulating condition is fulfilled when the reference value for the activation level of the adaptive flow regulating system is below a first flow regulating threshold value.

5. The method according to claim 4, wherein the adaptive flow regulating condition is fulfilled when an estimated time is below a second flow regulating threshold value, said estimated time being the time it will take before the reference value for the activation level of the adaptive flow regulating system reaches a value corresponding to an inactive adaptive flow regulating system.

6. The method according to claim 1, wherein the first condition is fulfilled when the measured value of the rotor speed has reached the speed limit value within a second predetermined period of time and the output power reference value has reached the power limit value within a third predetermined period of time.

7. A wind turbine controller comprising a processing unit adapted to perform the method according to claim 1.

8. A wind turbine comprising the wind turbine controller according to claim 7.

* * * * *